US008119175B2

(12) United States Patent
Soper et al.

(10) Patent No.: US 8,119,175 B2
(45) Date of Patent: Feb. 21, 2012

(54) ALGINATE MATRIX PARTICLES

(75) Inventors: Jon Christian Soper, Florence, KY (US); Jeff Molnar, Mason, OH (US); James Michael Vale, Cincinnati, OH (US)

(73) Assignee: Givaudan S.A., Vernier (CH)

( * ) Notice: Subject to any disclaimer, the term of this patent is extended or adjusted under 35 U.S.C. 154(b) by 1924 days.

(21) Appl. No.: 10/555,727

(22) PCT Filed: May 5, 2004

(86) PCT No.: PCT/CH2004/000270

§ 371 (c)(1),
(2), (4) Date: Nov. 7, 2005

(87) PCT Pub. No.: WO2004/098318

PCT Pub. Date: Nov. 18, 2004

(65) Prior Publication Data

US 2006/0292280 A1 Dec. 28, 2006

(30) Foreign Application Priority Data

May 9, 2003 (GB) .................................. 0310673.9

(51) Int. Cl.
*A23L 1/22* (2006.01)

(52) U.S. Cl. .......................................... 426/98; 426/534

(58) Field of Classification Search .................... 426/96, 426/98, 534, 89
See application file for complete search history.

(56) References Cited

U.S. PATENT DOCUMENTS

| | | | | |
|---|---|---|---|---|
| 3,567,650 | A | 3/1971 | Bakan | |
| 3,971,852 | A | 7/1976 | Bergensten et al. | |
| 4,515,769 | A * | 5/1985 | Merritt et al. | 424/49 |
| 4,822,534 | A | 4/1989 | Lencki et al. | |
| 5,266,335 | A * | 11/1993 | Cherukuri et al. | 426/3 |
| 5,912,030 | A * | 6/1999 | Huzinec et al. | 426/3 |
| 6,039,901 | A | 3/2000 | Soper et al. | |
| 6,045,835 | A | 4/2000 | Soper et al. | |
| 6,106,875 | A * | 8/2000 | Soper et al. | 426/89 |
| 6,325,951 | B1 * | 12/2001 | Soper et al. | 264/4.3 |
| 2007/0292361 | A1 | 12/2007 | Virgallito et al. | |
| 2008/0113018 | A1 | 5/2008 | Wieland et al. | |
| 2008/0277812 | A1 | 11/2008 | Guisinger et al. | |

FOREIGN PATENT DOCUMENTS

| | | | |
|---|---|---|---|
| EP | 0 455 598 | A | 11/1991 |
| EP | 0 856 355 | A2 | 5/1998 |
| FR | 2 570 604 | A | 3/1986 |
| WO | WO 93/19622 | A | 10/1993 |
| WO | WO 99/17871 | A | 4/1999 |
| WO | WO 03/084516 | A1 | 10/2003 |

OTHER PUBLICATIONS

Igoe, Robert S.; Hui, Y. H. Dictionary of Food Ingredients (4th Edition). (pp. 91-92). Springer—Verlag. Online version available at: http://knovel.com/web/portal/browse/display?_EXT_KNOVEL_DISPLAY_bookid=1092&VerticalID=0.*

Igoe, Robert S.; Hui, Y. H. Dictionary of Food Ingredients (4th Edition 2001). (pp. 91-92). Springer—Verlag. []Online version available at: []http://knovel.com/web/portal/browse/display?_EXT_KNOVEL_DISPLAY bookid=1092&VerticalID=0.*

E. Quevedo, J. Steinbacher, D.T. McQuade, *Interfacial Polymerization within a Simplified Microfluidic Device: Capturing Capsules*, J.Am. Chem.Soc. 2005, 127, 10498-10499.

Excerpt from Römpp online, Hydrokolloide (in German).

English translation of Excerpt from Römpp online, Hydrokolloide, Aug. 2004.

A. Ström, M.A.K. Williams, *Controlled calcium release in the absence and presence of an ion-binding polymer*, Journal of Physical Chemistry B 2003, 107(40), 10995-10999.

Opposition filed by Henkel AG & Co. to European Patent No. EP 2 071 919 B1, Jul. 12, 2011 (in German).

English Translation of Henkel's Opposition to European Patent No. EP 2 071 919 B1, Jul. 12, 2011.

Poncelet, D. et al. "Production of alginate beads by emulsification/internal gelation.I.Methodology" Applied Microbiology and Biotechnology, vol. 38, 1992, p. 39-45. (XP009090637).

A. Esquisabel, et al., "Production of BCG Alginate-PPL Microcapsules by Emulsification/internal Gelation", J.Microencapsulation, 1997, vol. 14, No. 5, p. 627-638. (XP000659518).

D. Poncelet, "Production of Alginate Beads by Emulsification/Internal Gelation", Annals of the New York Academy of Science, 2001, vol. 944, No. 1, p. 74-82. (XP002464386).

* cited by examiner

*Primary Examiner* — Jyoti Chawla
(74) *Attorney, Agent, or Firm* — Curatolo Sidoti Co., LPA; Joseph G. Curatolo; Salvatore A. Sidoti

(57) ABSTRACT

Heterogenous matrix particles having a continuous phase of a polymer and a discontinuous phase of an oil, and optionally an active such as a flavor or a fragrance. The continuous phase comprises at least one filler. The matrix particles exhibit high loading efficiency and low amounts of surface oil.

20 Claims, No Drawings

ALGINATE MATRIX PARTICLES

CROSS REFERENCE TO RELATED APPLICATIONS

This application is a national stage application of International Application No. PCT/CH2004/000270, filed May 5, 2004, which claims the benefit of Application No. GB 0310673.9, filed 9 May 2003, from which applications priority is claimed.

The invention is concerned with matrix particles encapsulating actives such as flavours and fragrances in a discontinuous phase of inclusions of oil dispersed within in a continuous phase of polymeric matrix material. The oil may be used as a carrier for the active, or may be an active in its own right.

Encapsulation technology is often employed as a means of protecting sensitive actives from harsh environments, and for releasing such materials in a time-dependent fashion on demand.

It is possible to encapsulate in a manner such that the particle produced consists of a shell of polymer material surrounding a single inclusion, e.g. a reservoir of oil, or a small number of large inclusions. Alternatively, matrix particles can be produced, which comprise a polymeric matrix within which is dispersed a plurality of inclusions, such as droplets of an oil.

Such matrix particles are generally formed from oil-in-water emulsions, wherein the matrix-forming polymer is water-soluble and forms the continuous phase, and the oil forms the discontinuous phase. Particularly useful polymers for forming such matrix particles are alginates. Alginates are highly water-soluble and are therefore easy to formulate. In addition, they are easily crosslinked to form water-insoluble matrices.

Matrix particles using alginate to provide water-insoluble particles after crosslinking are known, for example, from WO 98/15191 and in WO 98/15192.

Unfortunately, these particles tend to have a high amount of surface oil. By "surface oil" is meant an undesirable concentration of oil occurring at the surface of particles. This is often a consequence of art-recognised production methods (such that newly-prepared particles already have it), or it can result dynamically over time by processes of diffusion. The presence of surface oil may be measured by NMR or determined qualitatively by observing poor macroscopic performance features, for example, matrix particles are sticky and clog or clump together to form aggregates or a cake, rather than being a free-flowing powder, or there occurs an uncontrolled release of the oil.

"Surface oil" is the weight percent of the sample that is oil which may be extracted from the sample by a simple solvent wash of the sample in a reagent that is non-intrusive to the sample matrix particles. The encapsulated oil is the oil effectively within the sample which is not extractable by mixing with solvent and filtration. The surface oil may be extracted using a non-polar solvent, such as tetrachloroethylene. The method is easily reproducible and its quantification by NMR utilizes a standard and blank point reference to calculate the sample weight-weight percent surface oil. It is also possible to quantify the weight-weight percentage of a sample as a whole that is oil ("Total Oil"), since the dry matrix, provided it has a low moisture content, will not emit a sharp signal to the NMR, as only liquid components give a sharp signal, the total amount of oil within a sample may be quantified when compared to the signals obtained for pure oil at various weights or concentrations and an empty analysis tube, serving as reference point readings for the instrument. For NMR measurements, a wideband NMR, such as a Bruker MiniSpec mq10 Analyzer, Bruker Canada Ltd., Milton Ontario, may be used.

A product with high surface oil is not free-flowing or may be clogged, with matrix particles sticking together at least partly, and it is visually unattractive for the user. Furthermore, premature release of the oil exposes it to ambient air unprotected and may bring about a change in its properties. For example, components of flavour or fragrance oils may decompose. In addition, the ratio of the components and therefore the organoleptic properties or balance of a flavour composition may change, due to the disproportionate evaporation of more volatile components.

Accordingly, whereas alginate and other polymers that bind high amounts of water are useful materials, there are considerable problems involved in their use in encapsulation.

It has now been found that the problem of surface oil can be overcome by incorporating in the matrix at least one filler. The invention therefore provides matrix particles comprising a plurality of inclusions of oil dispersed within a matrix, the matrix comprising a crosslinked polymer and at least one filler in an amount sufficient to prevent the formation of surface oil to a desired degree.

In this manner, it is possible to produce matrix particles that exhibit a high loading efficiency, and it is possible to produce particles that have a low amount of surface oil. Matrix particles typically have a total oil content (oil within the matrix particle and surface oil) of about 48-56% 10 when 60% oil was used in the emulsion (measured according to NMR-test described herein-above).

The matrix particles can be produced by one of two processes disclosed below to provide matrix particles with a different size distribution, which benefits different applications.

"Matrix particle" as used in this application refers to a particle comprising as a continuous phase and as a matrix material a polymer and in a discontinuous phase an oil dispersed within the matrix, e.g. a multitude of oil droplets. The hydrophilic matrix material is cross-linked, for example, by formation of salt bridges, to form cross-linked matrix particles and thereby is rendered water-insoluble.

Fillers for polymeric materials are well known in the plastics art. They are generally cheap, readily-available organic and inorganic materials, used to extend the materials and reduce costs. Fillers useful in the present invention are inert, insoluble, non-swellable substances, which form a dispersion of solid particles in water. Examples of such materials include carbonates, silicates, sulphates, phosphates, for example magnesium carbonate, calcium carbonate, calcium phosphate, calcium sulphate, magnesium silicate, aluminium silicate, ground limestone, clay, talc, titanium dioxide, and organic substances such as cellulose polymers, microcrystalline cellulose, derivatives thereof and combinations of any or all of the aforementioned substances.

For application in the field of flavours, the filler will also have to be acceptable as a food ingredient.

A preferred filler is microcrystalline cellulose. Preferably, the filler is added to the formulation in a ratio of filler to polymer from 2:1 to 1:3, preferably 2:1 to 1:2, more preferably 1.5:1 to 1:1.5, most preferably about 1:1 (wt/wt) to result into matrix particles according to the invention. Alginate matrix particles comprising microcrystalline cellulose surprisingly have a reduced amount of surface oil.

"Microcrystalline cellulose" (MCC) is a purified, partially depolymerised cellulose that is produced by treating a source of cellulose, preferably alpha cellulose in the form of pulp from fibrous plant materials, with a mineral acid, such as hydrochloric acid. The acid selectively attacks the less ordered regions of the cellulose polymer chain thereby exposing and freeing the crystalline sites which form crystallite aggregates which constitute the microcrystalline cellulose. These are then separated from the reaction mixture, and washed to remove degraded by-products. The resulting wet mass, generally containing 40 to 60 percent moisture, is referred to in the art by several names, including hydrolysed cellulose, level-off DP cellulose, microcrystalline cellulose, microcrystalline cellulose wetcake or simply wetcake. When the wetcake is dried and freed of water, the resulting product, microcrystalline cellulose, is a white, odourless, tasteless, relatively free-flowing powder, insoluble in water, organic solvents, dilute alkalis and acids. It disperses in water and has the properties of a gum. For a filler description of microcrystalline cellulose and its manufacture see U.S. Pat. No. 2,978,446. Microcrystalline cellulose is manufactured, for example, by FMC Corporation and sold under the designation VICEL®.

MCC may be replaced by or mixed with other fillers that are inert, essentially insoluble and essentially do not swell, and are capable of forming a dispersion of solid particles in water. These materials include non-starch polysaccharides, celluloses, modified starches, and other polymers, including proteins, such as zein.

Whereas oils are particularly preferred examples of discontinuous phase, other water-immiscible materials may also be used in the matrix particles of this invention, along with or instead of oils. The use of the term "oil" in this invention comprehends these other materials. Such materials include any water-immiscible material or mixture of materials suitable for forming the discontinuous phase and may, for example, be selected from the group consisting of lipophilic substances, lipids, fats and oils, mono- or diglycerides, lipophilic fat replacer, and sucrose polyester.

Preferred oils are vegetable oils, GRAS vegetable oil, mineral oil, miglyol oil, and other oils with good flavour solvent properties, or combinations thereof. The oil may itself be an active in its own right, or it may contain actives, or actives may be loaded to the matrix particles after their formation.

The invention is particularly useful for encapsulating flavours, but other actives may also be encapsulated by the method according to the invention. The term "active" as used in this application includes any material or single compound used for its odorous or flavourant, odor- or flavor enhancing, blending or modifying properties. The term as used herein also includes pheromones, drugs, colorants, and inks.

Fragrance or flavor materials may be obtained by chemical synthesis from synthetic, fossil or natural raw materials or by physical operations from natural sources. The class comprises aroma chemicals, essentials oils, natural extracts, distillates and isolates, oleoresins, including natural products, such as tree moss absolute, geranium oil, jasmine absolute, patchouli oil, rose oil, sandalwood oil, vetiverol and ylang-ylang oil etc., alcohols, such as citronellol, EBANOL®, geraniol, linalool, phenylethyl alcohol, SANDALORE®; aldehydes and ketones such as FLOROZONE® (3-(4-ethylphenyl)-2,2-dimethypropional), hydroxycitronellal, Iso-E-Super® (1,2,3,4,5,6,7,8-octahaydro-2,3,8,8-tetramethyl-2-octanaphtalene), Isoraldein®, maltol, methyl cedryl ketone, methylionone, vanillin; ethers and acetals, such as ambrox, geranyl methyl ether, rose oxide and SPRIAMBREBE® (2', 2', 3,7,7-pentamethylspiro[bicyclo[4.1.0.]heptane-2,5'[1,3] dioxan]); esters and lactones, such as BERRYFLOR®, γ-decalactone and γ-undecalactone, and many more.

Matrix material useful in the process of the present invention includes alginate or a polymer of with the ability to bind comparably large amounts of water, or combinations of such polymers. Alginate is a high-molecular-weight carbohydrate obtained e.g. from seaweed and other algae. Alginates are linear copolymers of a-L-guluronate (G) and b-D-mannuronate (M). The alginate chain may be regarded as a block copolymer consisting of "G-blocks" (homopolymeric regions of guluronate residues) "M-blocks" (homopolymeric regions of mannuronate residues) and "MG blocks" (copolymeric regions of a random-like alternating sequence of M and G) of varying length. Besides being heterogeneous with respect to the chemical composition, alginates have quite a broad molecular weight distribution. Alginate is a collective term for a family of polymers. Their properties depend on their block structure and molecular mass. Above a certain critical molecular mass the properties of the alginates are mainly governed by the monomeric composition and block structure. In general, an increase in the content of guluronate gives mechanically stronger gels with enhanced stability in the presence of non-gelling/anti-gelling ions (e.g. $Na^+$, $Mg^{2+}$) and calcium sequestering agents. High guluronate-containing gels exhibit high porosity and lower shrinkage during gel formation. At high content of mannuronate, the gels become softer and more elastic; they shrink more during gel formation with concomitant reduction of porosity.

For encapsulation according to the present invention, all types of alginate can be used. Those with a high molecular weight are generally preferred for their higher mechanical stability in the tertiary emulsion process described hereinunder, where their higher viscosity is less critical. For the spray-drying process described hereinunder, alginates of lower molecular weight are preferred. Salts of alginate form viscous solutions and hold large amounts of water. A preferred alginate is sodium alginate (CAS 9005-38-3), which is sold under the registered trademark PROTANAL by FMC Biopolymers, Philadelphia, USA. Useful alginate salts include iron, magnesium, potassium, ammonium alginate, and calcium alginate.

Whereas alginate is particularly desirable for the production of matrix particles according to the invention, other hydrophilic polymers with characteristics similar to those of alginate may also be employed additionally to or instead of alginate, and the term "alginate" as used herein includes said other polymers. Other examples of useful hydrophilic polymers are polysaccharides such as the structurally-related pectin and derivatives thereof. Pectin is a polymer consisting of polygalacturonic acid, of which the carboxylic acid groups are partly esterified with methanol. For high heat stability, the use of a pectin with a low degree of esterification, especially one less than 5%, is preferred. Depending on the polymer used, an alternative or additional crosslinking agent may be employed, as is well known in the art.

Matrix particles according to the invention may preferably be prepared to result in substantially rounded matrix particles of mostly spherical shape, as opposed to irregular agglomerates or elongated stringy matrix particles, that tend to be formed when the shear force is too low or too high, respectively, during their preparation.

The matrix particles may range in size from 5-2000 μm in diameter, preferably 10-1000 μm, more preferably 20-600 μm. Matrix particles are substantially insoluble in water. In the processes according to the invention described hereinunder, size of matrix particles and range of size distribution may be adjusted according to the desired application depending on choice of process and adjustment of process parameters.

Matrix particles may have a moisture content of 1-10% (corresponding to a water activity of Aw=0.7), preferably a moisture content of 6-7%. Moisture content of a sample is the level, on a weight to weight basis, of water present within a sample. This moisture may exist as free water in a liquid sample or hydrated matrix of a dry product sample. Moisture content may be determined by Karl Fischer titration via a Karl Fischer type reagent, e.g. as described in "Coulometric Determination of Trace Water in Active Carbonyl Compounds Using Modified Karl Fischer Reagents", Analytical Chemistry, 1987, 59, 749-753; "Evaluation of Two Pyridine-Free Karl Fischer Reagents", Hercules Inc. Analytical Research, Aug. 8, 1983, DDR 87-045-01; "Improvements in Karl Fischer Method for Determination of Water", Volume 27, page 450, Journal of Analytical Chemistry, March 1955; and "Nature of the Karl Fischer Reagent", Aquametry, 1948. The procedure is applicable providing the sample is soluble in the solvent used. Solvent chosen should contain minimal or no free water. Reagents used are the following: Ethylene Glycol, low water (CAS 107-21-1), Methanol, low water, (CAS 67-56-1), and Hydranal Composite 5 reagent containing <70% 2-Methoxyethanol (CAS 109-86-4), <20% Imidazole (CAS 288-32-4), <10% Sulfur Dioxide (CAS 7446-09-5), and <10% Iodine (CAS 7553-56-2).

"Stabilisers" that stabilise the emulsion during the formation of the particles, such as emulsifiers or surfactants, may be present in some embodiments of the present invention. Suitable stabilisers are known to the art. These include but are not limited to synthetic stabilisers such as magnesium stearate, glycerol, ethoxylated monoglycerides, glycerol esters of tartaric acid, of lactic acid, of diacetyltartaric acid, of citric acid, or of acetic acid, glycerol esters of fatty acids including mono- and diglycerides of fatty acids, glyceryl monostearate, propylene glycol esters of fatty acids, calcium stearoyl lactylate, polyglycerol esters of fatty acids, polyglycerol esters of interesterified ricinoleic acid, propylene glycol mono- and di-esters, dioctyl sodium sulphosuccinate, sodium stearoyl lactylate, sodium oleyl lactylate, calcium stearoyl lactylate, calcium oleyl lactylate, sorbitan esters of fatty acids, sorbitan monostearate, sorbitan tristearate, sucrose esters of fatty acids, sodium lauryl sulfate, sodium dioctyl sulfosuccinate, and polymers such as polysorbates (TWEEN®) or sorbitan esters (SPAN®). TWEEN® is a group of polyoxyethylene fatty acid derivatives including Tween-20 (polyoxyethylene (20) sorbitol monolaurin), Tween-40 (polyoxyethylene (20) sorbitol monopalmitat), Tween-60 polyoxyethylene (20) sorbitol monostearin) and Tween-80 (polyoxyethylene (20) sorbitol monolein).

Stabilisers also include soybean saponin, enzymatically modified soybean saponin, transglycosylated soybean saponin, lecithin, fractionated lecithin, enzymatically modified or decomposed lecithin, vegetable sterol, vegetable lecithin, octenyl succinated starch (CAPSUL).

Preferred stabilisers are plant gums such as gum acacia (e.g. Senegal or Seyal), gum Arabic (e.g. Seyal or Senegal), multidextrin, guar gum, locust bean gum, xanthan gum, karaya gum, Tara gums, gellan gums, Tragacanth, carageenan, and other gums.

Matrix particles according to the invention optionally contain excipients. These will be known to the person skilled in the art and include for example anti-caking agents, anti-foaming agents, anti-oxidants, binders, colorants, diluents, disintegrants, emulsifiers, enzymes, fats, flavor-enhancers, flavoring agents, gums, lubricants, polysaccharides, preservatives, proteins, solubilisers, solvents, stabilisers, sugar-derivatives, surfactants, sweetening agents, vitamins, waxes, and the like. Examples of these excipients are described in such known sources as "Perfume and Flavor Materials of Natural Origin", S. Arctander, Ed., Elizabeth, N. J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1 ed., The Cosmetic, Toiletry and Fragrance Association, Inc., Washington, 1988.

In a particularly preferred embodiment, the invention provides matrix particles comprising in the discontinuous phase an oil-comprising flavour, and in the continuous phase alginate and microcrystalline cellulose (MCC).

In another aspect of the invention, matrix particles that comprise an oil and that have a low surface oil content are provided. Matrix particles according to the invention have a surface oil content of below 10% (wt/wt), preferably below 5% (wt/wt), more preferably below 3% (wt/wt), most preferably below 1% (wt/wt).

The matrix particles may be coloured. This may be achieved by any convenient means, for example, by incorporating colouring matter into the particle prior to particle formation, or by absorbing colour into particle after particle formation, or by coating the particle with a coloured coating after particle formation. Any suitable colouring matters or coatings known to the art to be useful for such a purpose may be used. Coloured particles may additionally be coated by a second coating to add another functionality.

Still another advantage of the present invention is that, due to the high mechanical stability of the matrix particles, they may be subjected to further processing steps whilst maintaining their structural integrity. In particular, the matrix particles may be coated without the coating operation causing any significant mechanical disruption to the matrix and without causing appreciable amounts of surface oil to form.

Coatings may be advantageously employed to add additional functionality to the matrix particles, for example to add to the impermeability of the matrix particles, thereby reducing loss of volatile components contained in the matrix particles by evaporation. Alternatively, they may be employed to retain ingredients that otherwise would display a tendency to leach out of the matrix particles. In particular, coatings may be employed to retain or prevent the leaking out of colours, and colour-stable matrix particles form still another aspect of the invention. Coatings may be materials which are insoluble or of low solubility in water. They form a film, preferably a continuous film, when applied to the matrix particles, and thereby prevent leakage of encapsulated material from the matrix particle to the ambient medium. If spray coating is used to apply the coating, the coating material should be soluble in an alcoholic solution, for example in ethanol. Coating materials include proteins, carbohydrates, lipids or combinations thereof. Suitable materials are well known to the skilled person and may be found in "CRC Handbook of Food Additives", Thomas E. Furia, CRC Press, in "Handbook of Pharmaceutical Excipients" by Ray C. Rowe, Pharmaceutical Press, or in "CRC Handbook of Food, Drug and Cosmetic Excipients" by Susan C. Smolinske, CRC Press. Coatings may be applied using methods well known in the art such as spray coating, pan coating, fluid bed coating, air-suspension coating, blending, dry blending, or pressure loading.

Preferred coatings are those that are soluble in a solvent but have a low water solubility and permeability and are not easily hydrated, as will be apparent to the skilled person. The coating material may be dissolved in solvent, sprayed on or otherwise applied to the surface of matrix particles, and the solvent evaporated to give matrix particles, which essentially will not swell or dissolve in water.

Accordingly, in another of its aspects the invention provides coated matrix particles, the coating being selected from the group comprising lipids or polymers such as collagen, ethylene vinyl acetate, polyanhydrides, polyglycolic acid, polyorthoesters, polylactic acid, cellulose ethers, carbohydrates, pectins, modified starches, natural gums, edible polymers, polymer flours, seaweed extracts, land plant extracts, water-insoluble modified cellulose, hydroxypropyl methylcellulose, hydroxypropyl cellulose, and polyglycerol fatty acid ester or derivatives or combinations thereof.

Matrix particles may be admixed to, adhered to or otherwise applied to food or fragrance products by methods well known to a person skilled in the art. Suitable methods depend on the application and include but are not limited to spraying, screw feeding, blending, and dry-blending.

Fields of application for matrix particles according to the present invention include, but are not limited to, protection and release of flavours, antioxidants, nutrients, acids, salts, bases and buffers, antimicrobial agents, preservatives, and pigments in various food and beverage products including any products for oral use such as mouthwash and dental care products, fragrance release from consumer care products such as cosmetics and perfumes, pharmaceuticals for controlled release of drugs, controlled release of insect pheromones in agriculture, lubricants in metallurgy, inks in carbonless copy paper, silicon sensors for measuring liquid density or intravascular pressure and many more.

Another aspect of the invention is directed to products comprising matrix particles, preferably flavour products, antioxidant products, nutrient products, antimicrobial products, preservative products, and pigment products, food products, beverage products, products inserted into the oral cavity such as mouthwash and dental care products, consumer care products, cosmetics and perfumes, pharmaceutical products, insect pheromone products, pesticide products, lubricant products, and inks. Abovementioned products, preferably food products and fragrance products comprising matrix particles, form another aspect of the invention.

Small matrix particles of e.g. 40-70 μm are especially beneficial for use in liquid products including food-products such as beverages, soy drinks, broth drinks, liquor, milk, still beverage, alcoholic drinks, beers, wine, soft drinks, mineral and aerated waters and other non-alcoholic drinks, fruit drinks, fruit juices, coffee, artificial coffee, tea, cocoa, beverage syrup, desserts, yoghurt, dips, topping syrup, whipped toppings, frozen foods, frozen fruit juices, ice cream, ice pops, canned fruit juices, canned fruits and vegetables, canned vegetable juices, fruit sauces, gravy, salad dressing, sour cream, table syrup, tomato sauce and paste, cooking oil, soup, sour cream mix, soy sauce, cooked breakfast cereal; and solid fragrance products such as perfumed consumer goods, household products and personal care products including eau de cologne, eau de toilet, extracts, lotions, creams, shampoos, salves, deodorants, liquid detergents. The small matrix particles are easier to mix, and stay longer in suspension. However, matrix particles outside the aforementioned size range are also beneficial in aforementioned products.

Larger matrix particles of e.g. 100-300 μm are especially suitable for use in solid products, including food products such as baked products, biscuits, bread, dry breakfast cereal, cakes, cookies, crackers, donuts, flan, muffins, pastries, confectioneries, cereals, custard, carageenan gel, gelatin dessert, pie filling, puddings, meat products, beef stew, chewing gum, chocolate, fondant, frosting, hard candy, marshmallow, jelly and preserves, pressed tablets, summer coating, cheese, imitation meat dishes, instant rice mix, margarine, mayonnaise, pancake mix, pet food, potatoes, snack foods, beverage powder, milk based beverage powder, sugar-free beverage powder, coffee instant, coffee-whitener, cordials; and solid fragrance products such as perfumed consumer goods, household products and personal care products including powders, soaps, detergent powders, tissues, fabrics, room deodorizers, room deodorizing gels, candles. Matrix particles outside the aforementioned range are also suitable for aforementioned products.

In food products comprising off-tastes or bitter notes unpleasant to the consumer, e.g. soy products, matrix particles without active or matrix particles containing flavours that mask or reduce off-tastes or bitter-notes are suitable for malodour absorption and reduction of off-tastes or bitter notes, e.g. of soy beans.

The present invention also relates to a process for production of matrix particles as hereinabove described. Therefore, in another aspect, the invention provides a process for preparing said matrix particles, comprising the steps of i) forming an emulsion comprising a polymer, a filler, and oil,
ii) forming matrix particles comprising a continuous phase containing a hydrophilic polymer and a filler and further comprising a discontinuous phase containing oil
iii) hardening said matrix particles by cross-linking the polymer
iv) drying the cross-inked matrix particles In a particular aspect, the invention provides a process for preparing alginate matrix particles, comprising the steps of 1) Forming an emulsion comprising alginate, a filler, and oil.
2) Forming matrix particles comprising a continuous phase containing alginate and a filler and a discontinuous phase comprising oil.
3) Hardening the matrix particles by cross-linking alginate
4) Drying the formed cross-linked matrix particles The steps 1) to 3) from above can be performed by a process involving spray drying and a second drying step (so-called "SD2"-process) or by a process involving a tertiary emulsion (so-called "TE"-process). The first process step of forming an emulsion is common to both processes and is described below.

1) First Step Common to SD2 and TE Process

A mixture comprising alginate, filler, and water is formed. The ratio of alginate and filler may be from about 10% filler (90% alginate) to 80% filler (20% alginate). Preferably the ratio is from about 25% filler (75% alginate) to about 66% filler (33% alginate), more preferably 33% filler (66% alginate) to about 66% filler, even more preferably from about 40% filler (60% alginate) to about 60% filler (40% alginate) by weight. Most preferably, 45%-55% filler is present in relation to alginate.

In the SD2 process, optionally a stabiliser is added. The TE process may not comprise a stabiliser.

Alginate and filler are mixed with an amount of water, the amount depending on the type of alginate and filler used, the temperature, the amount of oil added, and the resulting viscosity. The resulting mixture should be deaerated for about one hour.

Alginate may be present in water as a 1-10% (wt/wt) solution, preferably a 3-4% (wt/wt) solution, and most preferably a solution of 1.5-2.5% (wt/wt). Depending on the type of alginate, e.g. its molecular weight and its copolymer composition, the solution may have to be more or less concentrated to influence viscosity of emulsion formed.

To the aqueous mixture of alginate and filler, oil is added in an amount of 10% to 80%, preferably 30%-70%, more preferably 55%-65%, and an oil-in-water (o/w) emulsion is formed by agitation, e.g. by stirring. Viscosity of the emulsion may be from about 2000 to 60.000 cps (as measured by ASTM (American Society for Testing and Materials) Test Method D 2857-95), more preferably 10000-40000 cps, and may be controlled by the addition of water and/or by temperature, as will be apparent to a person skilled in the art.

Suitable homogenisation methods to form an o/w emulsion will be immediately apparent to a person skilled in the art and include the use of a homogenizer or other high shear mixing apparatus.

The matrix particle size distribution of the oil droplets may be adjusted depending on the desired size for the respective application by the control of shear force, depending on the homogenisation method e.g. by adjusting the stirring speed. For the SD2 process, the process may be adjusted such that approximately 95% of droplets are smaller than 50 μm, preferably smaller than 20 μm. Most preferably more than 95% of the droplets are 10 to 20 μm in diameter. Depending on the application and the desired quality of matrix particles, droplet size and size distribution may be adjusted accordingly, i.e. more than 90%, 80%, 70%, 60% or only more than 50% of the above-mentioned droplet size may be required. Viscosity may be controlled by temperature. Depending on the polymer that is used in the continuous phase, pH may have to be adjusted, as will be apparent to the skilled artisan. If alginate is used as polymer in the continuous phase, pH need not be controlled.

The following process steps 2) and 3) may be accomplished either by the SD2 or by the TE process.

In one embodiment of the invention, matrix particles are produced by the SD2 process. The SD2 process comprises the formation of an emulsion as described hereinabove under 1). The emulsion preferably is stabilised by the addition of a stabiliser. It further comprises steps 2) and 3) as described herein-below.

2) SD2-Process

The alginate emulsion is spray-dried in a first spray-drying step. The size of resulting spray-dried particles is controlled by adjusting the respective spray-drying method as will be apparent to the skilled person, for example by adjusting the nozzle or the spinning disc. The particles formed during spray drying may have diameter of about 20-150 μm, preferably 20-100, most preferably about 20-70 μm. The spray-dried particles are collected.

Suitable spray-drying methods are apparent to a person skilled in the art and include, but are not limited to, spray drying, belt-drying, a combination of spray-drying and belt-drying such as the Filtermat® system, air atomisation, multistage dryer, high pressure atomisation, and spinning disk atomisation.

3) SD2 Process

The collected spray-dried particles are hardened by cross-linking alginate. Said particles are introduced to a solution of multivalent cations, e.g. ions of calcium, strontium, barium, iron, silver, aluminium, manganese, copper and zinc, preferably calcium, the solution may be 0.9-10%, preferably 0.9-2% calcium chloride. The solution may be in a suitable liquid such as water or alcohol, preferably ethanol, or a mixture of water and alcohol. The ratio of water to alcohol depends on the application. If more water is used, resulting matrix particles are more stable. More alcohol will lower the amount of surface oil but also may extract oil from the interior of the particles. A ratio of 50:50 (wt/wt) of water to alcohol is suitable for most applications.

The time of exposure to the multivalent cation solution may vary depending on the ion solution used and the total amount and concentration of the solution. The exposure time for the respective ion and concentration can be easily determined by a person skilled in the art. About one hour is usually sufficient when 0.9-10% calcium chloride in a ratio of 0.7:1-4:1, preferably 1.2:1-3:1, more preferably 1.5:1-2.5:1 saline solution: spray-dried particles (wt/wt) is used. The amount of ions necessary depends on the amount of alginate to be cross-linked and may be adjusted as known to a person skilled in the art. Instead of saline solution an additional or alternative cross-linking agent may be used, as is well known in the art.

4) SD2 Process

The cross-linked particles resulting from step 3) are subjected to a second drying step to result in the matrix particles of the present invention. This may be performed by spray drying. In order not to destroy the cross-linked particles, a spray-drying method with low shear force is preferred. Suitable methods will be immediately apparent to a person skilled in the art. For example, a spray dryer with a low shear positive displace pump in combination with a rotary atomiser wheel can be used. Alternatively, many different pumps may be applied. Instead of a rotary wheel, alternatively a spray-nozzle may be used.

Alternatively to the second drying step by spray drying, the cross-linked particles may be dried by other drying methods, which will be apparent to the person skilled in the art. For example, the second drying step can be performed by fluid bed drying. An anti-caking agent may be added at this stage or it may be added beforehand, the hardened matrix particles may be passed through a sieve, and may then be subjected to fluid bed drying.

As will be apparent to a person skilled in the art, the particle sizes of the spray dried emulsion may be adjusted to the respective application, for example by adjusting the size of oil droplets in the emulsion in the first spray-drying step.

In another embodiment of the invention, matrix particles are formed by the Tertiary Emulsion process (TE).

The TE process is suitable for producing larger matrix particles with higher loading, the filler being especially critical because alginate may be partly washed out during processing and without filler the TE process is prone to result in particles which easily collapse.

The TE process comprises steps 1) to 4). To form an emulsion, the first step 1) is performed as described hereinabove. No surfactants should be present since they may adversely effect the third step of the TE process. Said emulsion is the so-called primary emulsion of the TE process. The TE process further comprises steps 2) to 4) described hereinunder. Said process comprises in said second step 2) the forming of a so-called secondary emulsion by addition of oil (oil-in-water droplets in oil); and in a third step 3) the forming of a so-called tertiary emulsion. In said third step, saline solution is added under agitation (oil-in-water-in-oil droplets in water), in which the matrix material is cross-linked and the hardened particles (essentially comprising the primary emulsion) separate from the oil phase and the saline solution and sink to the bottom of the container to be collected and dried I a fourth step.

2) TE-Process

The primary emulsion of step 1) described above is mixed with oil under agitation and a secondary emulsion is formed, which is an oil-in-water-in-oil emulsion. The ratio of primary emulsion to oil (v/v) may vary widely. A preferred ratio of primary emulsion:oil is 0.5:1 to 1:20, more preferably 0.75:1 to 1:5, most preferably 1:1 to 1:2.

Suitable agitation to form an emulsion in this step and also in the following process steps depends on a number of factors including viscosity and geometry of the container used; it may be adjusted as will be apparent to a person skilled in the art, e.g. by selection of container and adjusting stirring speed accordingly.

3) TE-Process

To cross-link alginate to form hardened particles the secondary emulsion is introduced to a saline solution of multivalent cations, e.g. ions of calcium, strontium, barium, iron, silver, aluminium, manganese, copper and zinc, preferably calcium, under agitation. The ratio of saline solution to secondary emulsion is 0.7:1 to 4:1, preferably 1.2:1 to 3:1, more preferably 1.5:1 to 2.5:1 (v/v). Hardening of particles requires a minimum amount of multivalent cations. The relative amounts of alginate and saline may vary widely, preferably the ratio of saline solid to alginate solid is 6:1 to 1:2, preferably 4:1 to 2:1, more preferably about 3:1 (wt/wt). The concentration of saline solution may vary accordingly, and preferably is from 0.5%-10%, more preferably 1%-5%, most preferably 2%-3%. The solution may be in a suitable liquid such as water or alcohol, preferably ethanol, or a mixture of water and alcohol. The ratio of water to alcohol depends on the application. If more water is used, resulting matrix particles are more stable. More alcohol will lower the amount of surface oil but also may extract oil from the interior of the particles. A ratio of 50:50 (wt/wt) of water to alcohol is suitable for most applications.

Instead of saline solution, an additional or alternative cross-linking agent may be used, as is well known in the art.

The cross-linked particles sink to the bottom of the container and can be easily collected. The oil phase collects at the top and can be recycled for efficiency, the saline phase collects in the middle. Saline solution concentration and amount of filler present in the matrix particles will influence the tendency of cross-linked particles either to sink to the bottom or to float. If cross-linked particles tend to float, saline solution concentration should be decreased or amount of filler in the matrix particles (and accordingly density) should be increased.

Cross-linking time depends on the agitation/shear force and may be adjusted accordingly, as will be apparent to a person skilled in the art. Too little shear will result in slow cross-linking and the formation of large agglomerates, too high shear will result in deformed stringy matrix particles. It will be apparent to a person skilled in the art to adjust shear force so that the resulting cross-linked particles will have a rounded, mostly spherical shape, as opposed to irregular agglomerates or elongated stringy matrix particles.

4) TE Process

Cross-linked particles may be allowed to dry by methods described under step 4) for the SD2 process.

To avoid handling operations and minimise costs it is desirable for a process to include minimal adjustments to be made. The SD2 and TE process mostly does not require pH adjustment and works under a wide pH range above pH 3.9, it does not require pH control.

Therefore in another of its aspects the invention provides processes operable without the adjustment of pH or temperature.

All process steps in the SD2 and TE processes may be performed at room temperature. To aid dissolution, control viscosity, or prevent microbial growth, temperature may be increased in the respective process steps; for example up to 100° C., preferably up to 80° C., most preferably up to 70° C.

In known processes relating to encapsulation, calcium chloride is used in high concentrations. Calcium chloride is corrosive, especially for metals. Residual salt from the process may start to cause corrosion in stainless steel tanks and fittings. Surprisingly, applicant has found that a calcium chloride concentration of 0.7-2.5%, preferably 0.9 to 1.5%, in an amount relative to the emulsion as indicated above, is sufficient to harden the particles.

Therefore in a particularly preferred embodiment, the present invention provides a processes using a minimal amount of calcium chloride, which is 0.7-2.5%, preferably 0.9 to 1.5% calcium chloride solution in a ratio of 0.7:1-4:1, preferably 1.2:1-3:1, more preferably 1.5:1-2.5:1 saline solution: secondary emulsion (v/v).

The SD2 process is suitable for easy control of small matrix particle sizes which are beneficial in malodour absorption applications e.g. in soy products. The SD2-process is suitable to produce matrix particles with a majority (>50%) the size of 10-200 μm, more preferably 20-100 μm, most preferably 40-70 μm in diameter. The TE process may be adjusted to result in a majority of matrix particles with sizes of 100-1000 μm, more preferably 100-600 μm, most preferably 100-300 μm in diameter.

Whereas oils may be actives in their own right and encapsulated directly, matrix particles may be formed with an oil that is not an active and these matrix particles may be subjected to an absorption technique essentially as described in U.S. Pat. No. 6,045,835 for microcapsules to load the desired active, for example a flavour or a fragrance to the matrix particles and form a granulate, powder or paste. Furthermore, matrix particles may be formed with an oil that is an active, such as a flavor oil, and other actives may be additionally absorbed after formation of the matrix particles.

During the loading process, the active is dissolved in the oil of the matrix particles. Actives are selected according to their solubility in the oil used in the matrix particles. To load a specific active, the matrix particles may be adapted to be formed with a suitable oil in which the active is soluble. Matrix particles may be loaded by adding the active to the matrix particles in presence of water for transportation of the compound through the matrix material by aqueous diffusion to the oil droplets within said matrix.

The amount of water depends on the amount of matrix material present and may be easily adjusted by the skilled artisan, suitable amounts of water amy be for example about 10% of water, 1-40% of flavour or fragrance or other active, and 50-89% of matrix particles (wt/wt/wt). Matrix particles may be mixed with water, then flavour or fragrance may be added and mixed for about 30-60 minutes and left for about an hour until dry, for example in a stainless steel mixing bowl (e.g. a Hobart Lab Scale Mixer). Depending on the application, alcohol, for example, ethanol, may be added to the mixture to enhance loading, as will be apparent to a person skilled in the art.

EXAMPLES

Example 1

Matrix Particles and SD2 Process Comprising Miglyol Oil

A solution is prepared from cellulose, sodium alginate and gum acacia in water and deairated for about one hour. Water is added in an amount corresponding to a viscosity of about 1.000 cps or less. Adding 60% wt miglyol oil, an oil-in-water emulsion is formed using a high shear mixer. The size distribution of the oil droplets is approximately 95% smaller than 10 μm. The formulation of the emulsion is given below.

Formulation of Alginate Emulsion (Basis: Dry Weight, 2% moisture):

12.5% FMC Microcrystalline Cellulose (AVICEL®)
12.5% Sodium Alginate (PROTANAL®)
15% Gum Acacia
60% Miglyol oil
and water (amount corresponding to viscosity of 1000 cps or less).

The Alginate emulsion is atomised into a spray dryer to form small 20-100 μm droplets, which dry rapidly in the dryer.

The collected spray-dried particles are added to a 1% calcium chloride solution in a ratio of 1:1 (wt/wt), and is left for about one hour before it is spray-dried in a second spray-drying-step in a spray-dryer with a low shear positive displace pump and a rotary atomiser wheel. The resulting matrix particles have 2-4% moisture and a size distribution ranging from about 20-100 μm diameter, with a mean of about 35-65 μm. The matrix particles are well-rounded essentially spherical matrix particles that have a surface oil content below 1-3%. The final product is a powder, which is insoluble in water.

Example 2

Size Distribution of Matrix Particles of a SD2 Process Run

Size distribution is measured and analysed using a Beckman Coulter Analyzer, 3.01 software, 2.02 firmware, with the following parameter: run length: 30 seconds, vibrator: 30, auger: 40, obscuration: 5%. Calculations are from 0.375 μm to 2000 μm.

volume [%] diameter larger than [μm]

| | |
|---|---|
| 10 | 169.3 |
| 25 | 97.22 |
| 50 | 63.27 |
| 75 | 41.07 |
| 90 | 25.30 |

The mean is 62.65 μm, the median 63.27 μm.

Example 3

Matrix Particles and TE Process Comprising Miglyol Oil

The primary emulsion is prepared from the ingredients indicated below by forming a solution of MCC and alginate in water and stirring.

20% FMC Microcrystalline Cellulose (AVICEL®)
20% Sodium Alginate (PROTANAL®)
60% Miglyol oil
and water (amount corresponding to viscosity of 25.000 cps).

The resulting secondary emulsion is prepared by adding 1 part primary emulsion to 0.75 parts Miglyol oil and stirring until the desired matrix particle size of about 10-30 μm is reached.

The secondary emulsion is introduced to a saline solution according to the formulation indicated below by pumping said emulsion through a silverston homogeniser at 10% back-pressure:

Formulation (parts per 1000 parts, wt/wt):
770 parts water
20 parts Calcium Chloride (to give a 2% calcium solution)
210 parts alginate primary emulsion The mixture is stirred for 2-3 hours. Upon stopping agitation, the oil will separate and is removed from the top of tank for recycling. The salt solution is removed up to the level of the matrix particles.

1% (total wt) silicon dioxide is added, the material is centrifuged to remove water. The calcium alginate cake is collected. The collected calcium alginate cake before drying has a matrix particle size of about 100-1200 μm, about 77% moisture, about 7.5% surface oil, and about 55% total oil. Calcium alginate cake is dried in a fluid bed dryer to 3% moisture.

Example 4

Size Distribution of Matrix Particles of a TE Process Run volume [%] diameter larger than [μm]

| | |
|---|---|
| 10 | 781.4 |
| 25 | 632.1 |
| 50 | 493 |
| 75 | 376.4 |
| 90 | 274.1 |

Example 5

Size Distribution of Matrix Particles of a TE Process Run volume [%] diameter larger than [μm]

| | |
|---|---|
| 10 | 355.8 |
| 25 | 259.7 |
| 50 | 180 |
| 75 | 118.1 |
| 90 | 78.53 |

The invention claimed is:

1. Matrix particles comprising a discontinuous phase of a plurality of inclusions of oil, wherein the oil is optionally flavor oil or fragrance oil, the oil dispersed within a matrix, the matrix comprising a crosslinked polymer and at least one filler.

2. Matrix particles according to claim 1 comprising a cross-linked polymer derived from the group consisting of alginate and pectin, derivatives thereof or combinations thereof.

3. Matrix particles according to claim 1 wherein the cross-linked polymer is alginate.

4. Matrix particles according to claim 1 comprising a filler selected from the group consisting of inorganic substances, organic substances, and combinations of any or all of the aforementioned substances.

5. Matrix particles according to claim 1 comprising a filler, in a ratio of 2:1 to 1:2, to the polymer.

6. Matrix particles according to claim 1 comprising microcrystalline cellulose as a filler.

7. Matrix particles according to claim 1 wherein the discontinuous phase comprises oil and the particles comprise surface oil below 10% (wt/wt).

8. Matrix particles according to claim 1 comprising at least one coating.

9. Matrix particles according to claim 1 comprising colouring matter.

10. Products comprising matrix particles according to claim 1 .

11. Process for preparing matrix particles as described in claim 1, comprising i) forming an emulsion comprising a polymer, a filler, and oil, ii) forming matrix particles comprising a continuous phase containing a hydrophilic polymer and a fitter and further comprising a discontinuous phase containing oil iii) hardening said matrix particles by cross-linking the polymer iv) drying the cross-linked matrix particles.

12. Matrix particles according to claim 1 wherein the filler comprises cellulose polymers or derivatives thereof.

13. Matrix particles according to claim 1 wherein the tiller comprises at least one of carbonates, silicates, sulphates, or phosphates.

14. Matrix particles according to claim 1 wherein the filler comprises at least one of magnesium carbonate, calcium carbonate, calcium phosphate, calcium sulphate, magnesium silicate, aluminium silicate, ground limestone, clay, talc, or titanium dioxide.

15. Matrix particles according to claim 1 comprising a filler, in a ratio of 1.5:1 to 1:1.5, to the polymer.

16. Matrix particles according to claim 1 comprising a filler in a ratio of about 1:1 to the polymer.

17. Matrix particles according to claim 1 wherein the discontinuous phase comprises oil and the particles comprise surface oil below 5% (wt/wt).

18. Matrix particles according to claim 1 wherein the discontinuous phase comprises oil and the particles comprise surface oil below 3% (wt/wt).

19. Matrix particles according to claim 1 wherein the discontinuous phase comprises oil and the particles comprise surface oil below 1% (wt/wt).

20. Matrix particles according to claim 1 comprising at least one of an active, a stabiliser, or an excipient.

* * * * *

UNITED STATES PATENT AND TRADEMARK OFFICE

CERTIFICATE OF CORRECTION

PATENT NO. : 8,119,175 B2
APPLICATION NO. : 10/555727
DATED : February 21, 2012
INVENTOR(S) : Soper et al.

It is certified that error appears in the above-identified patent and that said Letters Patent is hereby corrected as shown below:

In column 15, Claim 11, the word “filler” is misspelled as “fitter”. Claim 11 should read:

11. Process for preparing matrix particles as described in claim 1, comprising i) forming an emulsion comprising a polymer, a filler, and oil, ii) forming matrix particles comprising a continuous phase containing a hydrophilic polymer and a filler and further comprising a discontinuous phase containing oil iii) hardening said matrix particles by cross-linking the polymer iv) drying the cross-linked matrix particles.

In column 15, Claim 13, the word “filler” is misspelled as “tiller”. Claim 13 should read:

13. Matrix particles according to claim 1 wherein the filler comprises at least one of carbonates, silicates, sulphates, or phosphates.

Signed and Sealed this
Third Day of April, 2012

David J. Kappos
*Director of the United States Patent and Trademark Office*

UNITED STATES PATENT AND TRADEMARK OFFICE

CERTIFICATE OF CORRECTION

PATENT NO. : 8,119,175 B2
APPLICATION NO. : 10/555727
DATED : February 21, 2012
INVENTOR(S) : Soper et al.

It is certified that error appears in the above-identified patent and that said Letters Patent is hereby corrected as shown below:

Column 15, line 2 (Claim 11, line 6) the word "filler" is misspelled as "fitter". Claim 11, Column 14, line 64 - Column 15, line 5 should read:

11. Process for preparing matrix particles as described in claim 1, comprising i) forming an emulsion comprising a polymer, a filler, and oil, ii) forming matrix particles comprising a continuous phase containing a hydrophilic polymer and a filler and further comprising a discontinuous phase containing oil iii) hardening said matrix particles by cross-linking the polymer iv) drying the cross-linked matrix particles.

Column 15, line 9 (Claim 13, line 1) the word "filler" is misspelled as "tiller". Claim 13, Column 15, lines 9-11 should read:

13. Matrix particles according to claim 1 wherein the filler comprises at least one of carbonates, silicates, sulphates, or phosphates.

This certificate supersedes the Certificate of Correction issued April 3, 2012.

Signed and Sealed this
First Day of May, 2012

David J. Kappos
*Director of the United States Patent and Trademark Office*